US008375361B2

(12) United States Patent
Bell et al.

(10) Patent No.: US 8,375,361 B2
(45) Date of Patent: Feb. 12, 2013

(54) IDENTIFYING CHANGES IN SOURCE CODE

(75) Inventors: David R. Bell, Southampton (GB); Chris Bygrave, Eastleigh (GB); Alex G. Fehners, West Sussex (GB)

(73) Assignee: International Business Machines Corporation, Armonk, NY (US)

( * ) Notice: Subject to any disclaimer, the term of this patent is extended or adjusted under 35 U.S.C. 154(b) by 1293 days.

(21) Appl. No.: 12/129,037

(22) Filed: May 29, 2008

(65) Prior Publication Data

US 2008/0301639 A1   Dec. 4, 2008

(30) Foreign Application Priority Data

May 29, 2007   (GB) ................................. 07109137.5

(51) Int. Cl.
*G06F 9/44*   (2006.01)
(52) U.S. Cl. ........ 717/120; 717/102; 717/109; 717/122; 717/162; 717/170
(58) Field of Classification Search .................. None
See application file for complete search history.

(56) References Cited

U.S. PATENT DOCUMENTS

| | | | | |
|---|---|---|---|---|
| 6,393,437 | B1 * | 5/2002 | Zinda et al. ................... | 717/124 |
| 6,405,364 | B1 * | 6/2002 | Bowman-Amuah .......... | 717/101 |
| 6,698,013 | B1 | 2/2004 | Bertero et al. | |
| 7,552,429 | B2 * | 6/2009 | Dettinger et al. ............. | 717/162 |
| 2002/0116702 | A1 * | 8/2002 | Aptus et al. ................... | 717/170 |
| 2004/0153994 | A1 * | 8/2004 | Bates et al. ................... | 717/110 |
| 2004/0230964 | A1 | 11/2004 | Waugh et al. | |
| 2005/0005258 | A1 * | 1/2005 | Bhogal et al. ................ | 717/102 |
| 2005/0027757 | A1 | 2/2005 | Kiessig et al. | |
| 2006/0020928 | A1 * | 1/2006 | Holloway et al. ............. | 717/136 |
| 2006/0041868 | A1 * | 2/2006 | Huang ........................... | 717/131 |
| 2006/0053410 | A1 * | 3/2006 | Charisius et al. ............. | 717/109 |
| 2006/0206866 | A1 * | 9/2006 | Eldrige et al. ................ | 717/122 |
| 2007/0006152 | A1 | 1/2007 | Ahmed et al. | |
| 2007/0011654 | A1 * | 1/2007 | Opperman ..................... | 717/122 |

OTHER PUBLICATIONS

John Posner, CASEVision / ClearCase Reference Pages [online], 1994, [Retreived on Oct. 14, 2011]. Retrieved from the internet: <URL: http://techpubs.sgi.com/library/manuals/1000/007-1613-030/pdf/007-1613-030.pdf pp. 1-579 Total of 596 pages.*

(Continued)

*Primary Examiner* — Don Wong
*Assistant Examiner* — Anibal Rivera
(74) *Attorney, Agent, or Firm* — Stephen R. Tkacs; Stephen J. Walder, Jr.; David A. Mims

(57) ABSTRACT

A data processing method comprises maintaining a source code repository, checking out a component from the source code repository, checking in a modified version of the component to the source code repository, identifying the changes between the modified version of the component and the original component, applying one or more pattern matching techniques to the identified changes, storing the output of the pattern matching techniques, and displaying the output.

20 Claims, 5 Drawing Sheets

OTHER PUBLICATIONS

Gerardo Canfora et al., Identifying Changed Source Code Lines from Version Repositories, IEEE, 2007 [Retrieved on Mar. 13, 2012]. Retrieved from the internet: <URL: http://delivery.acm.org/10.1145/1270000/1269028/29500014.pdff> pp. 1-8.*

Peter Weibgerber et al., Identifying Refactoring from Source-Code Changes, IEEE 2006, [Retrieved on Sep. 25, 2012]. Retrieved from the internet: <URL: http://ieeexplore.ieee.org/stamp/stamp.jsp?tp=&arnumber=4019578> 10 Pages (231-240).*

David Schuler et al., Mining Usage Expertise from version archives, 2008, [Retrieved on Sep. 25, 2012]. Retrieved from the Internet: <URL: http://dl.acm.org/citation.cfm?id=1370779> 4 Pages (121-124).*

Josh MacDonald et al., PRCS: The Project Revision Control System, 1998, [Retrieved on Sep. 25, 20125]. Retrieved from the Internet: <URL: http://www.springerlink.com/content/k70j716603302j88/fulltext.pdf> 13 Pages (33-45).*

Yamamoto et al., "Accumulative Versioning File System Moraine and Its Application to Metrics Environment MAME", http://sel-pop.ics.es.osaka-u.ac.jp/~lab-db/betuzuri/archive/313/313.pdf, ACM SIGSOF Software Engineering Notes, vol. 25, Issue 6, Nov. 2000, pp. 80-87.

* cited by examiner

IDENTIFYING CHANGES IN SOURCE CODE

BACKGROUND

1. Technical Field

This invention relates to a data processing method and to a data processing system. The method and system handle computer source code that is stored in a source code repository.

2. Description of the Related Art

In the field of source code creation, there exist a number of tools that are arranged to carry out analysis of the changes made to a product's source code between two or more levels. These typically require third party software to analyse two or more complete levels of code retrospectively. This is then used by project management to discover areas of intense change and used to focus effort during the design and development phase of subsequent product levels.

The drawbacks of this solution are that this information is gathered retrospectively and requires specific tooling and possibly large amounts of post-processing. This tooling may be unavailable to developers and testers that are actually working on the software product. If this kind of information were gathered cumulatively and at a lower level (i.e. visible to the developers and testers making and verifying the code changes) it could be used to focus the teams involved much earlier in the release cycle than current methods, ultimately resulting in lower development costs and greater product quality.

SUMMARY

It is therefore an object of the invention to improve upon the known art.

According to a first aspect of the present invention, there is provided a data processing method comprising maintaining a source code repository, checking out a component from the source code repository, checking in a modified version of the component to the source code repository, identifying the changes between the modified version of the component and the original component, applying one or more pattern matching techniques to the identified changes, storing the output of the pattern matching techniques, and displaying said output.

According to a second aspect of the present invention, there is provided a data processing system comprising a source code repository, an interface for checking out a component from the source code repository and for checking in a modified version of the component to the source code repository, an analyser for identifying the changes between the modified version of the component and the original component, and for applying one or more pattern matching techniques to the identified changes, a database for storing the output of the pattern matching techniques, and a display device for displaying said output.

According to a third aspect of the present invention, there is provided a computer program product on a computer readable medium for executing a data processing method, the product comprising instructions for maintaining a source code repository, checking out a component from the source code repository, checking in a modified version of the component to the source code repository, identifying the changes between the modified version of the component and the original component, applying one or more pattern matching techniques to the identified changes, storing the output of the pattern matching techniques, and displaying said output.

Owing to the invention, it is possible to provide a method of storing medium- and high-level change data in a source code repository (in addition to the typical low-level information stored by most code repositories) in such a way that the change data can be accessed by integrated development environments (IDEs) and displayed as formatted information to programmers and developers.

Existing methods of providing information about source code changes typically involve one of the following two approaches. Firstly, methods comprising taking two complete levels of source and analyzing them in a separate tool. These techniques are cumbersome and require large amounts of processing. The invention described here would incrementally build up and maintain such information, so it would always be available and up-to-date. No heavyweight tooling is required and the information gathered is readily available to anyone accessing the source code.

Secondly, methods comprising questionnaires for developers to complete as their code changes are checked in. While these can yield useful information and a limited set of questions could be useful, the quality of data is dependent upon the individuals booking the changes. The automated approach of the invention gives better consistency and detail than can be achieved manually.

The system implementing the novel and inventive method analyses changes to source code as they are submitted by developers, at the time of submission, to identify what has changed, down to language-specifics such as method bodies, class interfaces, and method signatures. This change information is then used to modify values associated with the changed file to cumulatively record different aspects of the file history. Such aspects includes bug fixes, new features, new methods, changes to public interfaces, new test-case material associated with the files functionality, and changes to the documented design.

This data is recorded in such a way as to be available to users of the source code repository, such as IDEs and project management tooling. In one embodiment the stored data would provide counters on each defined aspect for individual source files, as well as providing cumulative counters for all directories recursively up the layout of the code tree. This would provide the groundwork for IDEs to display useful source code measures at a number of different levels, including product-wide, giving insights into (among others) code volatility and stability, testing focus, and changing interfaces (hinting at potential candidates for redesign).

The stored data directly reflects the status of the current source files and source tree, and is stored in such a way that the data is directly associated with the source. The data, in one embodiment, consists of a unique value or metric for each defined aspect for each individual source file or component, as well as providing cumulative values at each parent directory level for each defined aspect, which holds recursive totals for sub-trees of the full source tree. This provides the necessary information for IDEs to quickly and easily display useful source code measures at any number of different levels within the source tree, from file specific though to product-wide. The IDEs are free to display this information however they wish, but as well as being able to display it in isolation, they would also have the capability to display it along side the actual source code to which it relates. The views of this data could be used to give insights into (among other things) code volatility and stability, testing focus, fix quality, and changing interfaces.

The invention can be implemented as a series of language-aware parsers. When a developer submits a source code change, the relevant parser for that particular piece of source is invoked and proceeds to analyse the changes looking for a number of different change types, including but not limited to method signatures, public & private API, algorithms, constants, class declarations, attributes, and import/include statements. Along with information acquired from either the developer or the issue tracking system to define whether this change relates to a bug, a feature, or an enhancement, the parser can use the nature of the code changes to alter a number of values associated with the file that record various aspects of the file change history.

The data can exist in two types: file specific data, and cumulative directory data. The file specific data would take the form of a number of integer values, one for each defined aspect of the file. The cumulative directory data can also take integer values; the sum of all the file specific data, and cumulative directory data for the files and directories contained within that directory.

A system implementing the method would have automatically to update the file specific data whenever changes on that file were accepted into the system. Any integer values would be incremented or decremented to reflect the number and nature of the submitted changed. The system would ensure that at the end of the transaction, all the cumulative directory data correctly reflects the latest values throughout the tree. The values themselves could be implemented as simple integer counters. Without further processing, these integers would gradually increase and lose their meaning in isolation and become useful only for comparisons. However the counters could be processed in order to keep them bounded. Three possible implementations are that firstly, any IDE could obtain the maximum value for each aspect counter by querying the root directory of the source tree. This maximum value can then be used to scale all subsequent values beneath this root node in the tree structure, showing at a glance how volatile a particular component is relative to the rest of the product. Secondly, the counters could be passed through an aging routine on a regular basis. Since the counters are being stored under version control, their change history is available and an aging algorithm based on configurable ages and weights could be used to reduce the effect of older changes and focus the values on a date range relevant to the individual project. Thirdly, the counters could simply be decremented by a particular amount at a particular interval, down to a minimum of zero. This would age the data and focus it on a recent timeframe. Both the amount and interval could be exposed as configuration points for the particular project to set.

BRIEF DESCRIPTION OF THE DRAWINGS

Embodiments of the present invention will now be described, by way of example only, with reference to the accompanying drawings, in which:—

DETAILED DESCRIPTION OF THE
ILLUSTRATIVE EMBODIMENTS

Figure 1:
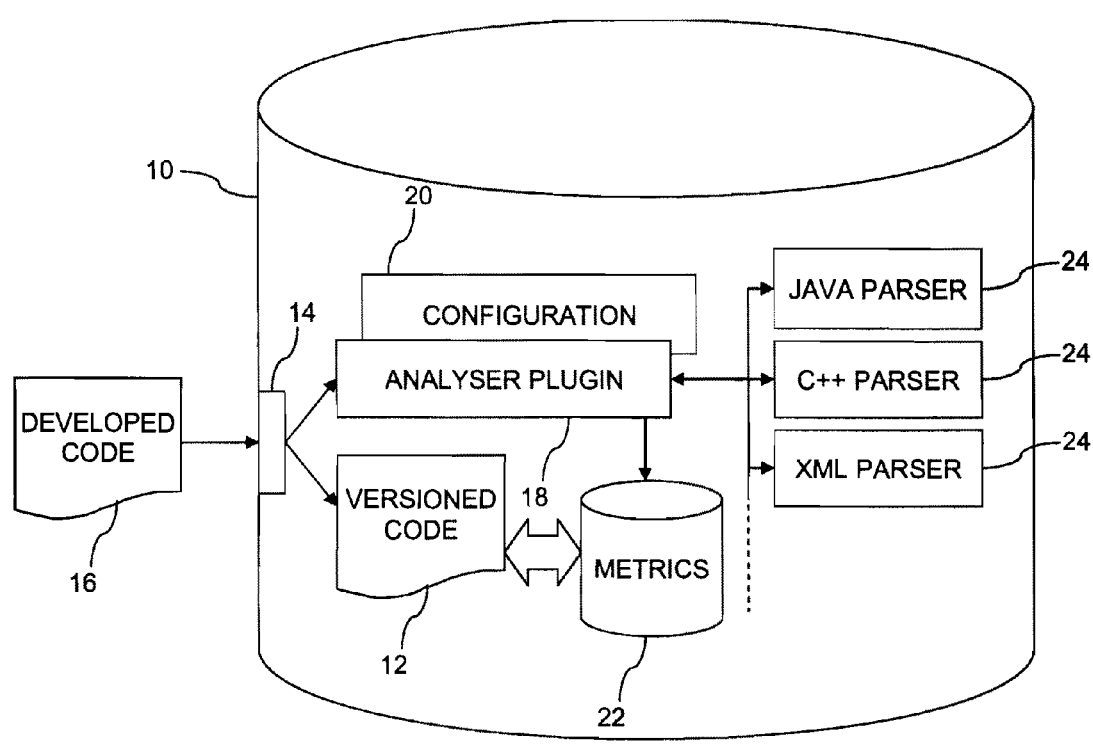
FIG. 1 is a schematic diagram of a data processing system.

FIG. 1 illustrates a data processing system 10, which is a version control system used for managing the creation of a complex software product. Such a software product (or project) will be created over a fairly long period of time (many weeks) and will involve large teams of programmers. The system 10 principally comprises a source code repository 12 and an interface 14. The repository 12 is a database that stores the current version of the source code that comprises the product and the interface 14 provide the programmers with access to the source code stored by the source code repository 12. In a conventional implementation, the programmers will be accessing the repository 12 through a local area network such as an intranet within a business. The interface 14 manages the access to the source code.

The interface 14 is also used for checking out components from the source code repository 12 and, later, for checking in a modified version of the component to the source code repository 12. Components within the source code repository 12 can be checked out of the repository 12 by a programmer who wishes to work on that specific component. The programmer will make additions and/or amendments to the source code, and when they have completed their work they will check back in the new source code 16 through the interface 14 to the repository 12. In this way, the source code that makes up the project is expanded and refined over time.

The data processing system 10 also includes an analyser 18 which communicates with a configuration component 20. The analyser 18 also receives any inputted source code and has access to the historical versioned source code maintained by the repository 12. The analyser 18 is for identifying changes between the modified version of the checked in component and the original component, and for applying one or more pattern matching techniques to the identified changes.

At the moment that the new source code 16 is checked into the repository 12, the analyser 18 will carry out the change identification and pattern matching on the new component and the old component that is being replaced. Once the changes between the two components are identified, the analyser 18 executes the pattern matching processes on the identified changes. The analyser 18 also has access to parsers 24 which support all of the languages that are being used in the creation of the software product maintained by the repository 12. In FIG. 1, JAVA, C++ and XML parsers 24 are available to the analyser 18.

In a preferred embodiment of the invention, at least part of the output of the pattern matching techniques comprises one or more integer metrics. An example of such an integer metric comprises the number of bytes changed between the modified component and the original component. This gives a very simple measure of the extent of the changes that have occurred in the modification carried out by the programmer. The parsers 24 can also be used to obtain a quality score for the changes that have been introduced by the check-in of the new component 16. The system 10 includes a database 22 for storing the output of the pattern matching techniques. The system also includes a display device (shown in FIGS. 3 to 5) for displaying the output of the pattern matching.

Figure 2:
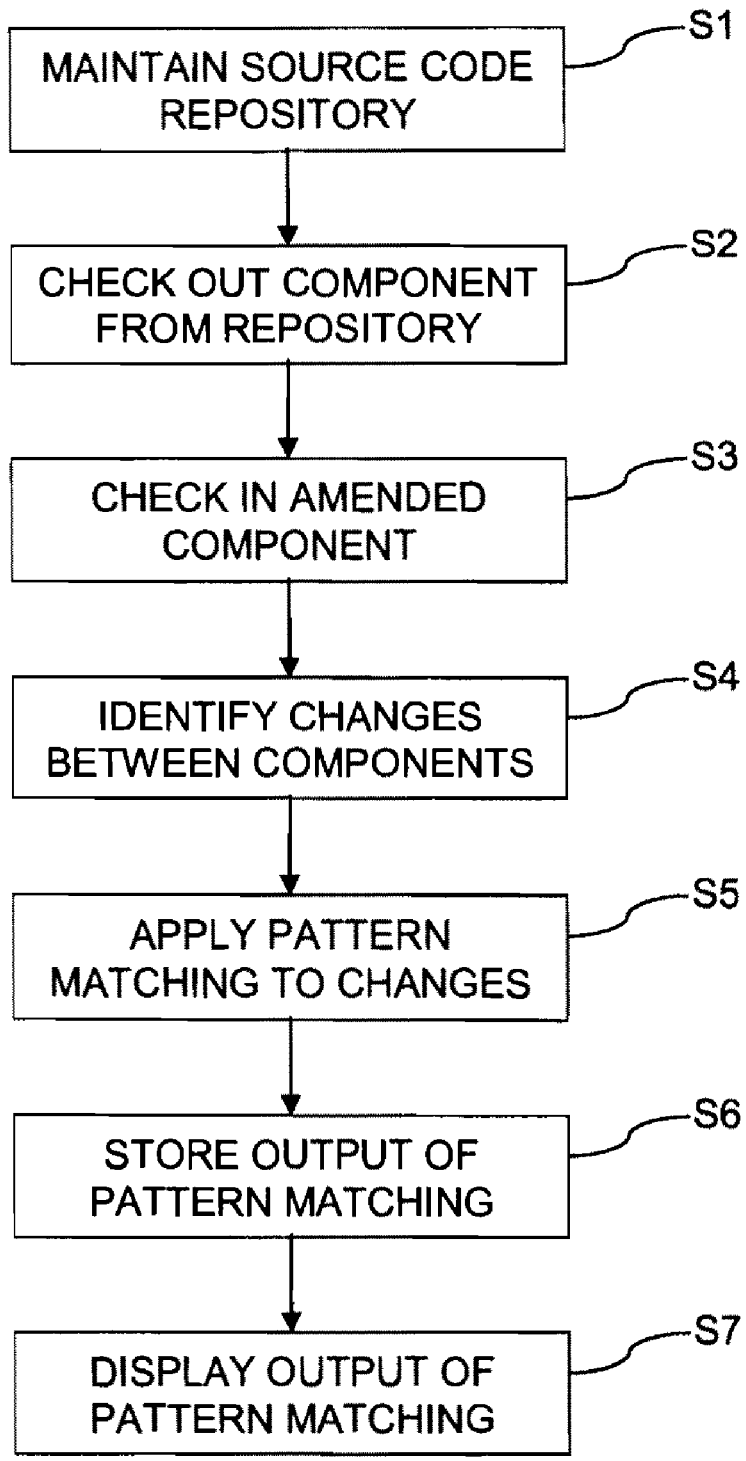
FIG. 2 is a flow diagram of a method of operating the data processing system.

FIG. 2 summarises the data processing method carried out by the system 10. The method comprises the steps of, step S1, maintaining the source code repository 12, step S2, checking out a component from the source code repository 12, step S3, checking back in a modified version of the component to the source code repository 12, step S4, identifying the changes between the modified version of the component and the original component, step S5, applying one or more pattern matching techniques to the identified changes, step S6 storing the output of the pattern matching techniques, and step S7, displaying the output.

The data stored by the database 22 is an intelligent processing of the identified changes between versions of each checked out and checked back in component. This data, which is the output of the pattern matching techniques, is available to any user who has access to the data processing system 10, and the source code repository 12 maintained by that system 10. Any user who is viewing source code maintained by the repository 12 will also have the option to view concurrently the data concerning the changes between a component and the previously stored version of that component. If the data includes metrics, then these numbers can be easily place alongside components within the source code, as that code is viewed on a display device.

The analyser 18 can be configured to apply a time decay to the stored output of the pattern matching techniques. In the simplest form, this time decay may mean that when a component is checked out and checked in for a second time, only the data relating to the changes between the latest two versions of the component is stored. This means that when a component is checked back in, any already stored data in the database 22 relating to that component is discarded. However, the time decay function could be more subtle, for example by discarding data relating to changes that are older than a specific time period, such as 30 days. This would mean that the number of times a component is checked in and out is irrelevant to the data stored by the database 22.

Figure 3:
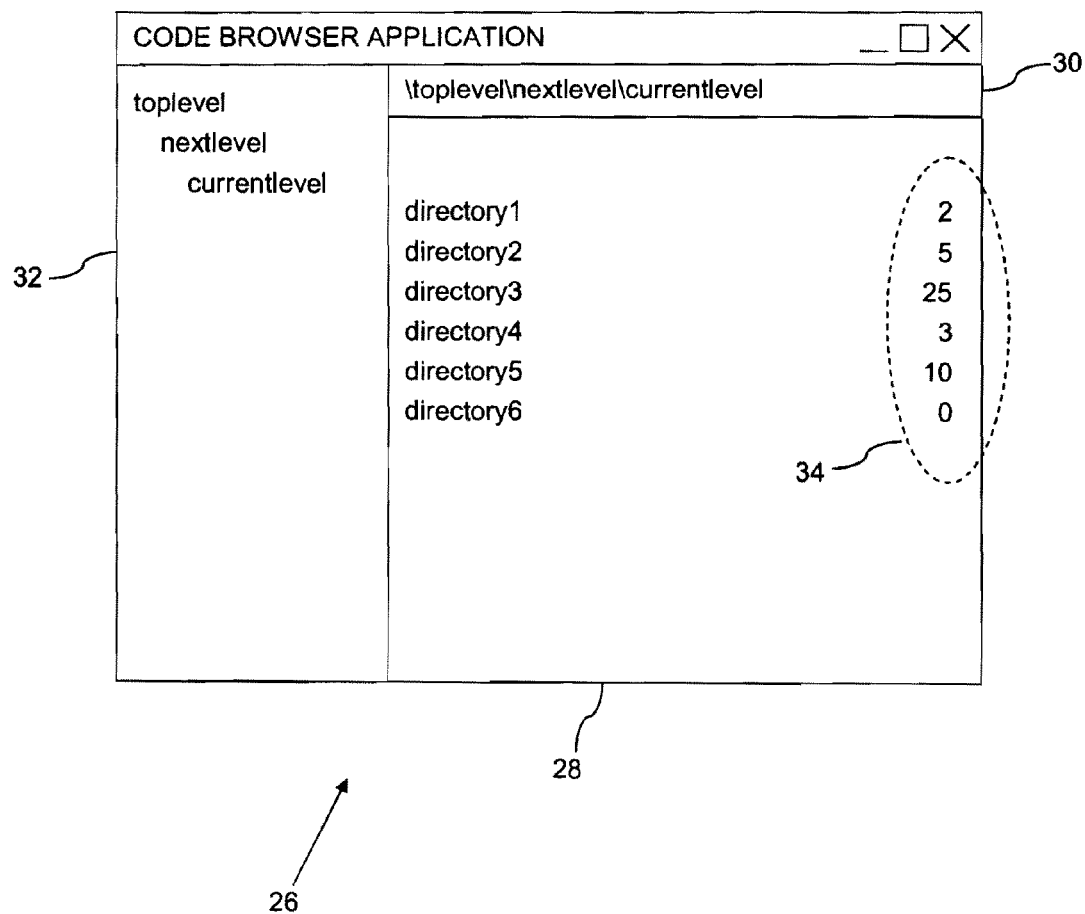
FIGS. 3 to 5 are schematic diagrams of screenshots of a display device of the data processing system.

FIG. 3 shows an example of how a display device 26 would look, which is operating as a viewer of the source code maintained in the repository 12 and of the change data stored by the database 22. A main window 28 shows the currently viewed components within the overall source code. Window 30 shows the current address of the components in the main window 28, and window 32 shows the hierarchy of a tree defining the relationship between the currently viewed level of the source code. The display device 26 is showing an IDE that is accessing the repository 12 and database 22, and presents the data in an "Explorer" type hierarchy of tree and branch, as is well understood in the field of computer technology. Standard manipulations of the data displayed by the IDE are possible.

The use of the term "component" to refer to the source code that is checked out by a programmer could be at any level in the hierarchical tree, which is being shown by the window 32. For example, a programmer could check out the component "current level", which would be all of the directories from directory1 to directory6, currently shown in the window 28. Alternatively, the component that is checked out by a programmer could just be a single directory such as directory4. The amount of source code checked out and the relative position in the tree of source code will depend upon the specific task that the programmer or team of programmers are currently undertaking.

Also shown in FIG. 3 are metrics 34, which represent the change data stored by the database 22. In the current window are shown six directories, being directory1 to directory6. A manager could have asked six different programmers to work on a respective directory, and after they have each been checked out, worked on and then checked back in, then the change metrics 34 show the level of change that has occurred in each directory. As discussed above, this metric could be showing the amount of bytes that have changed within the specific component, or could relate to a quality score concerning the nature of the changes made on the component. The pattern matching that has been carried out by the analyser 18 has produced an output, and the displaying of this output comprises displaying the output of the pattern matching techniques on a per component basis.

The data processing system 10 is operated so that a user interface such as a conventional mouse or keyboard connected to a computer can be used so that the system 10 can be further arranged to receive a user input defining a position in the tree hierarchy of source code components of the source code repository 12, and the system 10 will accordingly adapt the displayed output of the pattern matching techniques (the metrics 34).

Figure 4:
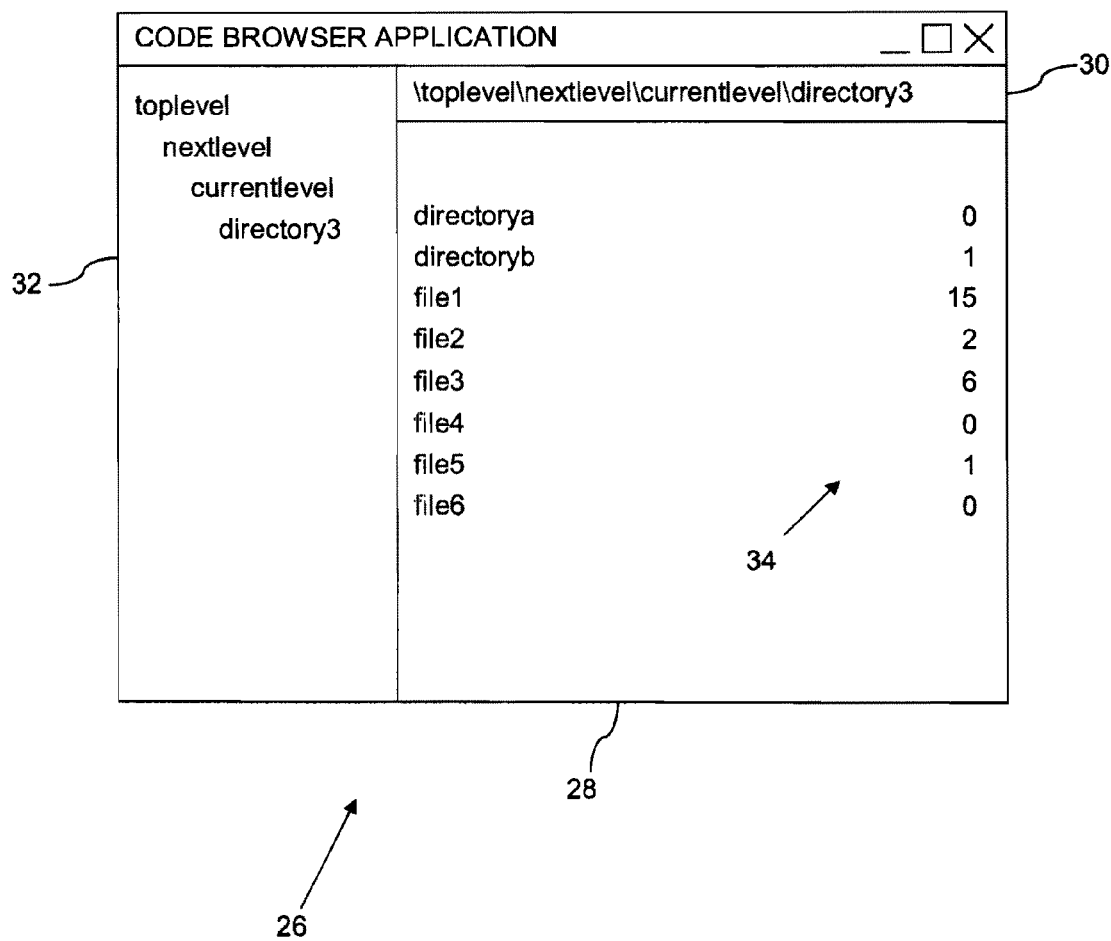

In the case of the components shown in FIG. 3, a manager or interested person may wish to further investigate the relatively high metric associated with the component directory3. The user can then select that component, and a view such as that shown in FIG. 4 will be obtained, which reflects the change in the hierarchy view. In FIG. 4, the windows 30 and 32 have been updated to respectively show the new address and new position in the hierarchy tree of the source code. The metric score of 25 for directory3 can be seen in FIG. 4 to be broken down into the subcomponents that make up that specific directory. Again, it is easy to see that the greatest amount of change (which may be quantitative or qualitative) has occurred with respect to file1 of directory3.

Figure 5:
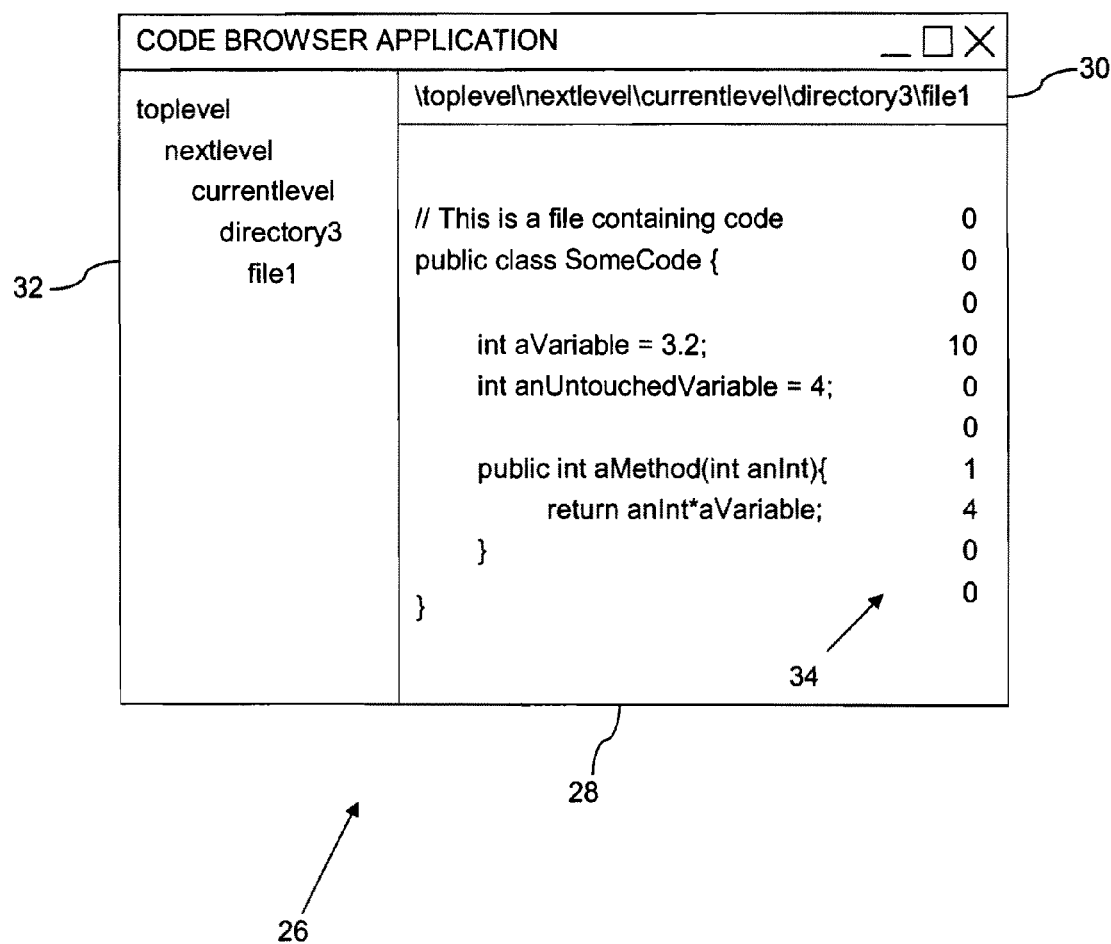

FIG. 5 shows a view after the user has selected filed and as before, the windows 30 and 32 have been updated to reflect that the component shown in the main window 28 is the component file1. The metric of 15 that file1 has been assigned in FIG. 4, can be seen in FIG. 5 broken down against the lines of source code within that file. In this case, the metric shown is measuring recent volatility within the code. This would show the developer that aVariable was very recently changed, the body and signature of aMethod were changed before that, and the remainder of the file has been unchanged for a period of time. This is a single example of a metric; one or more additional metrics could be shown in the same view. Another example which could have been used is a metric showing the external impact of the changes detected. In this case, the local variable change to aVariable would be measured significantly lower than the signature change of the public method aMethod.

The invention claimed is:

1. A data processing method comprising:
   maintaining a source code repository;
   checking out a component from the source code repository;
   checking in a modified version of the component to the source code repository to form a modified version of the component;
   automatically identifying changes between the modified version of the component and the component responsive to checking in the modified version of the component;
   applying one or more pattern matching techniques to the identified changes, wherein applying the one or more pattern matching techniques generates an output;
   storing the output of the one or more pattern matching techniques; and
   presenting the output in association with the component in a code browser application.

2. A method according to claim 1, and further comprising applying a time decay to the stored output of the one or more pattern matching techniques.

3. A method according to claim 1, wherein the output of the one or more pattern matching techniques comprises one or more integer metrics.

4. A method according to claim 3, wherein the one or more integer metrics comprise a number of bytes changed between the modified version of the component and the component.

5. A method according to claim 1, wherein presenting the output comprises displaying the output of the pattern matching techniques on a per component basis.

6. A method according to claim 5, and further comprising receiving a user input defining a position in a tree hierarchy of source code components of the source code repository, and adapting the displayed output of the one or more pattern matching techniques according to the user input.

7. The method of claim 3, wherein presenting the output comprises presenting the code browser application comprising a first window of display presenting a hierarchy of a tree defining a relationship of a currently viewed level of the source code in the source code repository and a second window of display presenting currently viewed components, wherein the second window of display presents the one or more integer metrics in association with respective components within the currently viewed components.

8. The method of claim 7, wherein presenting the output further comprises:
- responsive to a user selecting a directory in the first window, presenting a hierarchy of a tree defining a relationship of the selected directory in the source code repository in the first window of display and presenting a set of components of the selected directory in the second window of display, wherein the second window of display presents one or more integer metrics in association with respective components within the selected directory; and
- responsive to a user selecting a source code component in the second window of display, presenting a hierarchy of a tree defining a relationship of the selected source code component in the source code repository in the first window of display and presenting lines of source code of the selected source code component in the second window of display, wherein the second window of display presents one or more integer metrics in association with lines of source code in the selected source code component.

9. A data processing system executed by a processor comprising:
- a source code repository;
- an interface for checking out a component from the source code repository and for checking in a modified version of the component to the source code repository;
- an analyser for automatically identifying changes between the modified version of the component and the component responsive to checking in the modified version of the component, and for applying one or more pattern matching techniques to the identified changes, wherein applying the one or more pattern matching techniques generates an output;
- a database for storing the output of the one or more pattern matching techniques; and
- a display device for displaying the output in association with the component in a code browser application.

10. A system according to claim 9, wherein the analyser is configured to apply a time decay to the stored output of the one or more pattern matching techniques.

11. A system according to claim 9, wherein the output of the one or more pattern matching techniques comprises one or more integer metrics.

12. A system according to claim 11, wherein the one or more integer metrics comprise a number of bytes changed between the modified version of the component and the component.

13. A system according to claim 9, wherein the display device is configured to display the output of the one or more pattern matching techniques on a per component basis.

14. A system according to claim 13, further comprising a user interface for receiving a user input defining a position in a tree hierarchy of source code components of the source code repository, the display device configured to adapt the displayed output of the one or more pattern matching techniques according to the user input.

15. A computer program product on a computer storage medium having computer readable instructions stored thereon, wherein the computer readable instructions, when executed by a computing device, cause the computing device to:
- maintain a source code repository;
- check out a component from the source code repository;
- check in a modified version of the component to the source code repository;
- automatically identify changes between the modified version of the component and the component responsive to checking in the modified version of the component;
- apply one or more pattern matching techniques to the identified changes, wherein applying the one or more pattern matching techniques generates an output;
- store the output of the one or more pattern matching techniques; and
- present the output in association with the component in a code browser application.

16. A computer program product according to claim 15, wherein the computer readable instructions further cause the computing device to apply a time decay to the stored output of the one or more pattern matching techniques.

17. A computer program product according to claim 15, wherein the output of the one or more pattern matching techniques comprises one or more integer metrics.

18. A computer program product according to claim 17, wherein the one or more integer metrics comprise a number of bytes changed between the modified version of the component and the component.

19. A computer program product according to claim 15, wherein presenting the output comprises displaying the output of the one or more pattern matching techniques on a per component basis.

20. A computer program product according to claim 19, wherein the computer readable instructions further cause the computing device to receive a user input defining a position in a tree hierarchy of source code components of the source code repository, and adapt the displayed output of the pattern matching techniques according to the user input.

* * * * *